(12) United States Patent
Laidig et al.

(10) Patent No.: US 8,433,257 B2
(45) Date of Patent: *Apr. 30, 2013

(54) INTEGRATED WAVEGUIDE TRANSCEIVER

(75) Inventors: David Laidig, Mesa, AZ (US); Kenneth V. Buer, Gilbert, AZ (US); Friedhelm Wachter, Phoenix, AZ (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/539,721

(22) Filed: Jul. 2, 2012

(65) Prior Publication Data

US 2012/0268329 A1 Oct. 25, 2012

Related U.S. Application Data

(63) Continuation of application No. 12/268,840, filed on Nov. 11, 2008, now Pat. No. 8,254,851.

(51) Int. Cl.
*H04B 1/38* (2006.01)
(52) U.S. Cl.
USPC ............................................ 455/90.3; 333/135
(58) Field of Classification Search .................. None
See application file for complete search history.

(56) References Cited

U.S. PATENT DOCUMENTS

| | | | |
|---|---|---|---|
| 2,754,483 A | 7/1956 | Zaleski | |
| 3,740,756 A | 6/1973 | Sosin | |
| 4,504,805 A | 3/1985 | Ekelman, Jr. et al. | |
| 5,434,575 A | 7/1995 | Jelinek et al. | |
| 5,614,874 A | 3/1997 | McCandless | |
| 6,087,908 A | 7/2000 | Haller et al. | |
| 6,122,810 A | 9/2000 | Nisbet et al. | |
| 6,323,819 B1 | 11/2001 | Ergene | |
| 6,396,441 B2 | 5/2002 | Perrott | |
| 6,512,485 B2 | 1/2003 | Luly | |
| 6,563,398 B1 | 5/2003 | Wu | |
| 7,109,938 B2 | 9/2006 | Franson | |
| 2002/0171597 A1 | 11/2002 | Krishmar-Junker | |
| 2002/0175875 A1 | 11/2002 | Verstraeten | |
| 2003/0067364 A1 | 4/2003 | Beis et al. | |
| 2005/0259026 A1* | 11/2005 | Cook | 343/779 |
| 2007/0075909 A1 | 4/2007 | Flynn | |
| 2007/0296518 A1 | 12/2007 | Avramis | |
| 2009/0224990 A1 | 9/2009 | Cezanne et al. | |

OTHER PUBLICATIONS

ISR/WO from PCT/US09/63605 dated Sep. 16, 2010.
ISR/WO from PCT/US10/30849 dated Dec. 3, 2010.
IPRP from PCT/US09/63605 dated May 26, 2011.

(Continued)

*Primary Examiner* — Cassandra Cox
(74) *Attorney, Agent, or Firm* — Snell & Wilmer LLP

(57) ABSTRACT

A method and system for an integrated transceiver is presented. The integrated transceiver includes a transceiver housing, where a waveguide is formed inside the transceiver housing using a transceiver housing and a sub-floor component. Neither transceiver housing nor the sub-floor component alone is configured to operate as a waveguide. The integrated transceiver can include a transceiver housing that forms a portion of an integrated waveguide assembly, where the transceiver housing alone does not form the waveguide, and another portion of the integrated waveguide assembly couples with the transceiver housing to form the waveguide of the integrated waveguide assembly. Further, the integrated waveguide portion of the sub-floor component can be a flat surface, where the integrated waveguide portion of the transceiver housing comprises substantially all the features of said integrated waveguide.

20 Claims, 12 Drawing Sheets

OTHER PUBLICATIONS

IPRP from PCT/US2010/030849 dated May 18, 2012.
Office Action dated Jan. 5, 2012 in U.S. Appl. No. 12/268,840.
Notice of Allowance dated Mar. 15, 2012 in U.S. Appl. No. 12/268,840.
Restriction Requirement dated Aug. 15, 2012 in U.S. Appl. No. 12/614,185.
Office Action dated Nov. 30, 2012 in U.S. Appl. No. 12/614,185.
Office Action dated Dec. 10, 2012 in U.S. Appl. No. 12/758,942.

* cited by examiner

INTEGRATED WAVEGUIDE TRANSCEIVER

REFERENCE TO RELATED APPLICATION

This application is a continuation of, and claims priority to, U.S. Ser. No. 12/268,840, filed on Nov. 11, 2008 and entitled "INTEGRATED ORTHOMODE TRANSDUCER."

FIELD OF INVENTION

The application relates to systems, devices, and methods for transmitting and receiving signals in a satellite antenna system. More particularly, the application relates to integrating one or more waveguide components of the system into a transceiver housing.

BACKGROUND OF THE INVENTION

With reference to prior art FIG. 1, in some satellite antenna systems 100 a single antenna (feed horn) 120 is connected to a transceiver 101, where the transceiver combines the functionality of both a transmitter and a receiver. In these embodiments, typically, the transceiver has a transmit port and a receive port. The transmit and receive ports are connected to an antenna feed 105. Antenna feed 105 generally comprises an orthomode transducer (OMT) 130, a polarizer 110, and the feed horn 120.

The feed horn, in this satellite antenna system arrangement, is a component that can convey RF signals to/from a remote location (such as a satellite). Feed horn 120 is connected to polarizer 110 and communicates transmit and receive RF signals between the polarizer and the feed horn. Signals communicated between the feed horn and the polarizer are circularly polarized. In linearly polarized systems, a polarizer is not required and a feed horn connects directly to an OMT. The polarizer is configured to convert linearly polarized signals to circular polarized signals and vice versa. Although described as two signals, these signals are communicated through a single output port of the polarizer and the polarizer communicates the two signals to a common port of the OMT. Moreover, the transmit and receive signals remain isolated due to at least one, or any combination of, polarization, frequency, and time diversity.

In addition to the common port, the OMT further comprises a transmit port and a receive port that are attached to matching ports on the transceiver housing. Thus, the OMT serves as a waveguide configured to connect a common port with at least a transmit port and a receive port. The OMT acts as a combiner/splitter of an RF signal so that a receive signal and a transmit signal can be communicated through the same feed horn with orthogonal polarizations.

Although this satellite antenna system is successfully employed in many systems, a need exists for improved systems that address issues of size, robustness, installation accuracy, tolerance issues, and the like. This is explained in more detail below.

First, attaching the feed horn, polarizer, and OMT to the transceiver can result in a bulky, volume consuming antenna system. It is typically desirable to make electronic components smaller for cost and aesthetic reasons, as well as other reasons. Also, generally, the components of the system need to be oriented relatively precisely and a bulky assembly such as this can introduce difficult design constraints with respect to the orientation of the antenna feed in reference to the reflector.

Second, generally the transceiver and the antenna feed are located outdoors exposed to the elements. This exposure can lead to water ingress (leakage) into the antenna feed and resultant flow into the transceiver, where electrical components can become damaged. One approach for minimizing the leakage problem is to seal the antenna feed's exposed connections with an epoxy or silicone solution. However, with the numerous connection points and edges, water can infiltrate the antenna feed. Indeed, each separate component in the antenna feed introduces an additional connection point that provides an opportunity for moisture to enter into the transceiver electronics by way of the antenna feed.

Third, each separate antenna feed component contributes to the length of time it takes to install the satellite antenna system in the field. Furthermore, each separate antenna feed component contributes to a chance of incorrect installation such as by installing the polarizer backwards, or reversing the transmit and receive ports.

Fourth, it is not uncommon for each part of the antenna feed to be manufactured by different companies. Each antenna feed component must then be connected to the adjoining components, and with each connection comes an increased opportunity for tolerance errors, which can increase the opportunity for moisture to enter the antenna feed and for performance degradation.

Thus, a need exists for improved satellite antenna systems, methods and devices for addressing these and other issues.

SUMMARY OF THE INVENTION

In accordance with various aspects of the present invention, a method and system for an integrated transceiver is presented. The integrated transceiver includes a transceiver housing, where at least a portion of an antenna feed is integrated into the transceiver housing. In an exemplary embodiment a waveguide (typically an orthomode transducer (OMT) or a diplexer) is formed inside the transceiver housing using a housing base and a sub-floor component. Neither the housing base nor the sub-floor component alone is configured to operate as a waveguide. In an exemplary embodiment, a portion of the waveguide is formed in the housing base and is part of the transceiver housing.

In various embodiments, the integrated transceiver can include a transceiver housing that forms a portion of an integrated waveguide assembly, where the transceiver housing alone does not form the waveguide, and another portion of the integrated waveguide assembly couples with the transceiver housing to form the waveguide of the integrated waveguide assembly. Further, the integrated waveguide portion of the sub-floor component can be a flat surface, where the integrated waveguide portion of the transceiver housing comprises substantially all the features of said integrated waveguide.

Furthermore, in an exemplary embodiment, an antenna system includes a feed horn, a polarizer, and an integrated transceiver. The integrated transceiver, in the exemplary embodiment, includes a transceiver housing base that forms a portion of an integrated waveguide assembly, and another portion of the integrated waveguide assembly aligns with the transceiver housing base to form the integrated waveguide assembly. In addition, in another exemplary embodiment, the antenna system includes a transceiver circuit that communicates with the integrated waveguide assembly to transmit and receive radio frequency signals.

BRIEF DESCRIPTION OF THE DRAWING FIGURES

A more complete understanding of the present invention may be derived by referring to the detailed description and claims when considered in connection with the drawing figures, wherein like reference numbers refer to similar elements throughout the drawing figures, and:

DETAILED DESCRIPTION

While exemplary embodiments are described herein in sufficient detail to enable those skilled in the art to practice the invention, it should be understood that other embodiments may be realized and that logical electrical and mechanical changes may be made without departing from the spirit and scope of the invention. Thus, the following detailed description is presented for purposes of illustration only.

In accordance with an exemplary embodiment of the present invention, one or more portions of an antenna feed are manufactured as integral portions of the transceiver. In particular, one or more portions of an antenna feed are manufactured as integral portions of the transceiver housing. In an exemplary embodiment, the OMT is an integral part of the transceiver housing. In another exemplary embodiment, the OMT and polarizer are formed as integral parts of the transceiver housing. In a further exemplary embodiment, the OMT, polarizer, and feed horn are all integral parts of the transceiver housing.

In yet further exemplary embodiments, the transceiver housing comprises a split-block OMT. Although described in various exemplary embodiments in greater detail herein, a split-block OMT, in an exemplary embodiment, is any OMT formed by the connection of two structural components, where neither component alone would function as an OMT. The OMT may be said to be "integral" with the transceiver housing when at least one of the two structural components forming the OMT is also part of the housing itself. For example, the integrated OMT of the present invention is not formed by merely inserting an OMT into the interior of a transceiver housing. In this way, the same structure that forms the OMT is, for example, also functional as an enclosure, as a heatsink, and/or as a structure supporting the transceiver circuit board.

Figure 1:
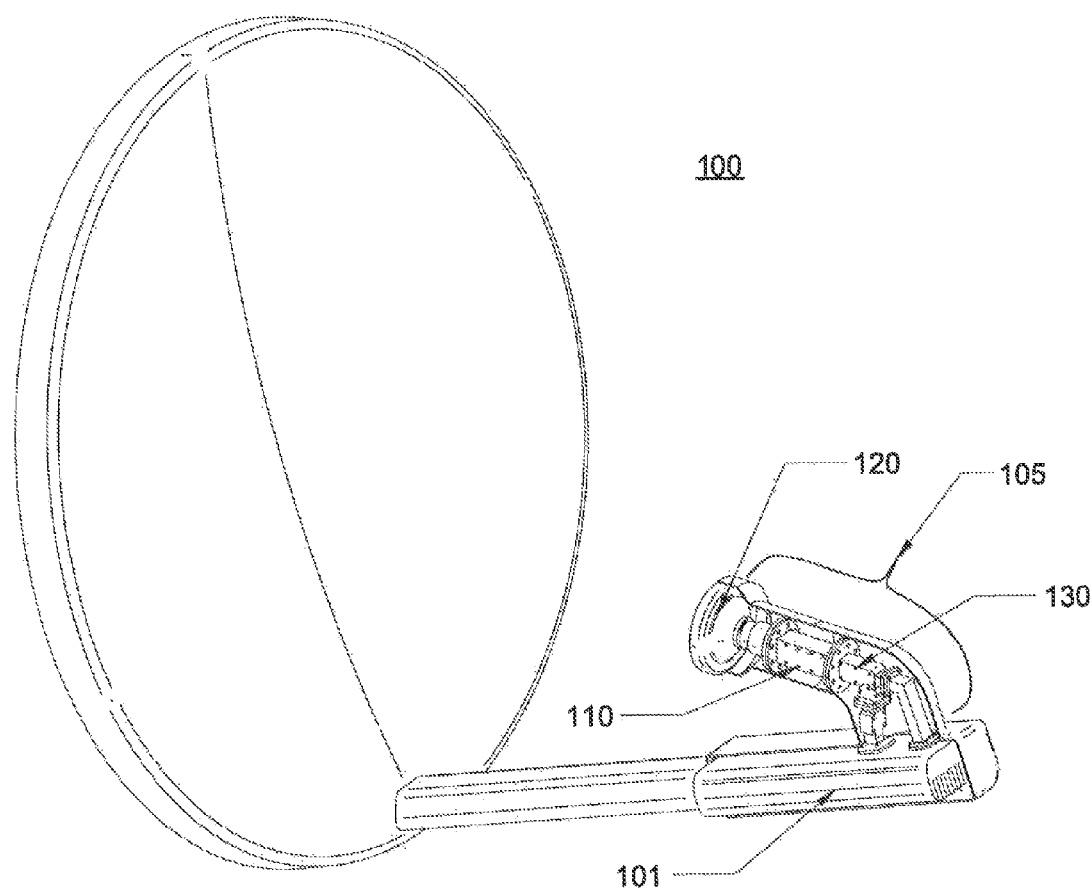
FIG. 1 illustrates a prior art antenna feed in connection with a transceiver.
Figure 2A:
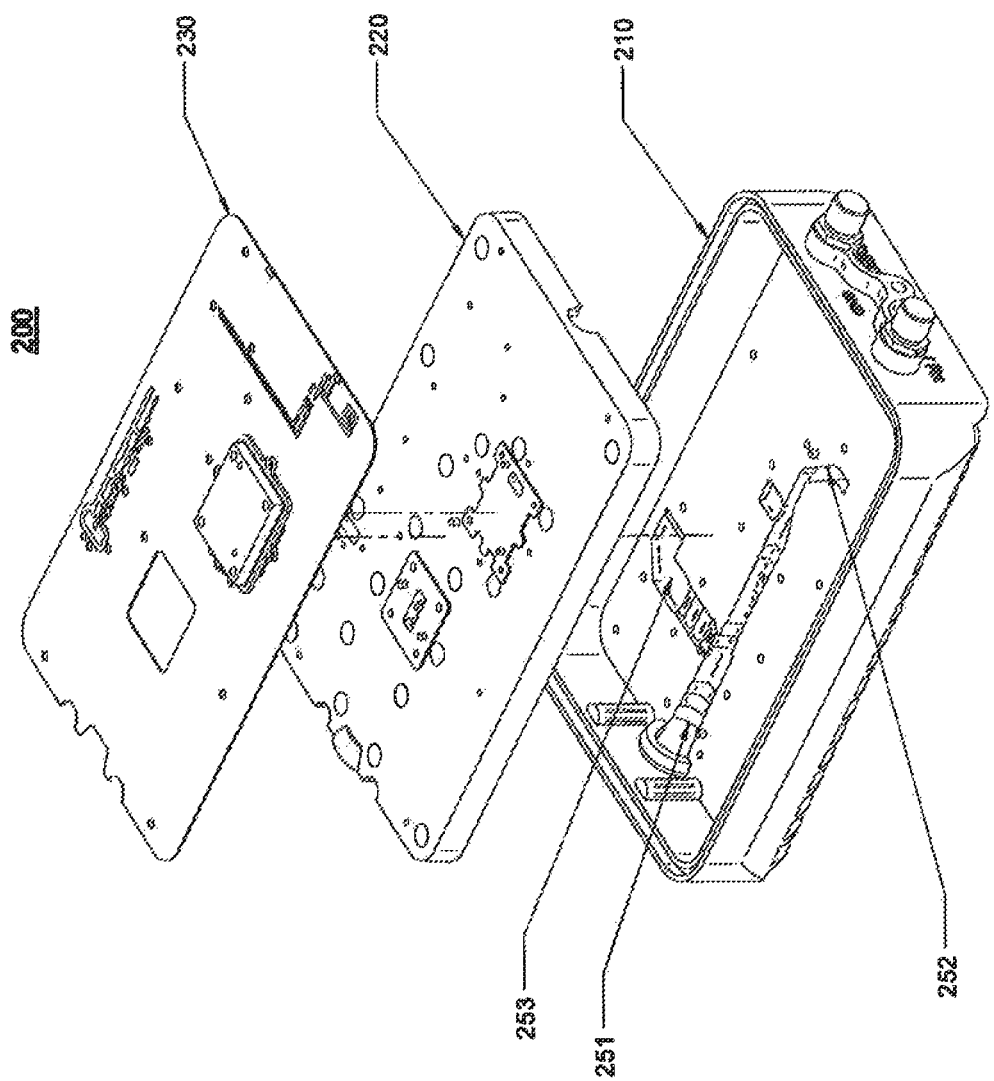
FIGS. 2A, 2B illustrate an exploded view of an exemplary integrated transceiver.
Figure 2B:
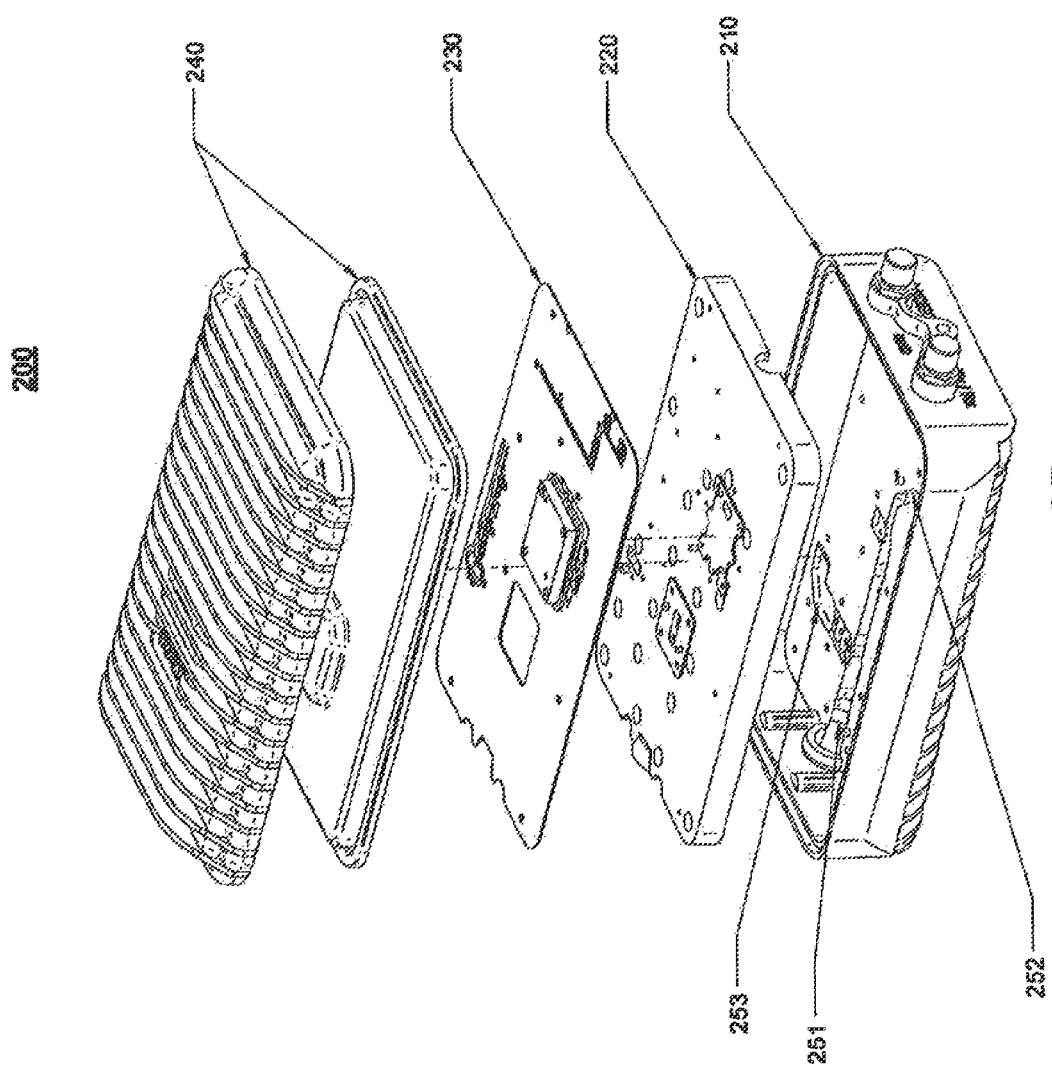

In accordance with an exemplary embodiment of the present invention and with reference to FIG. 2A, an integrated transceiver 200 comprises a housing base 210, a sub-floor component 220, and a transceiver printed circuit board (PCB) assembly 230. In another exemplary embodiment and with reference to FIG. 2B, integrated transceiver 200 further comprises a housing cover 240.

Figure 3A:
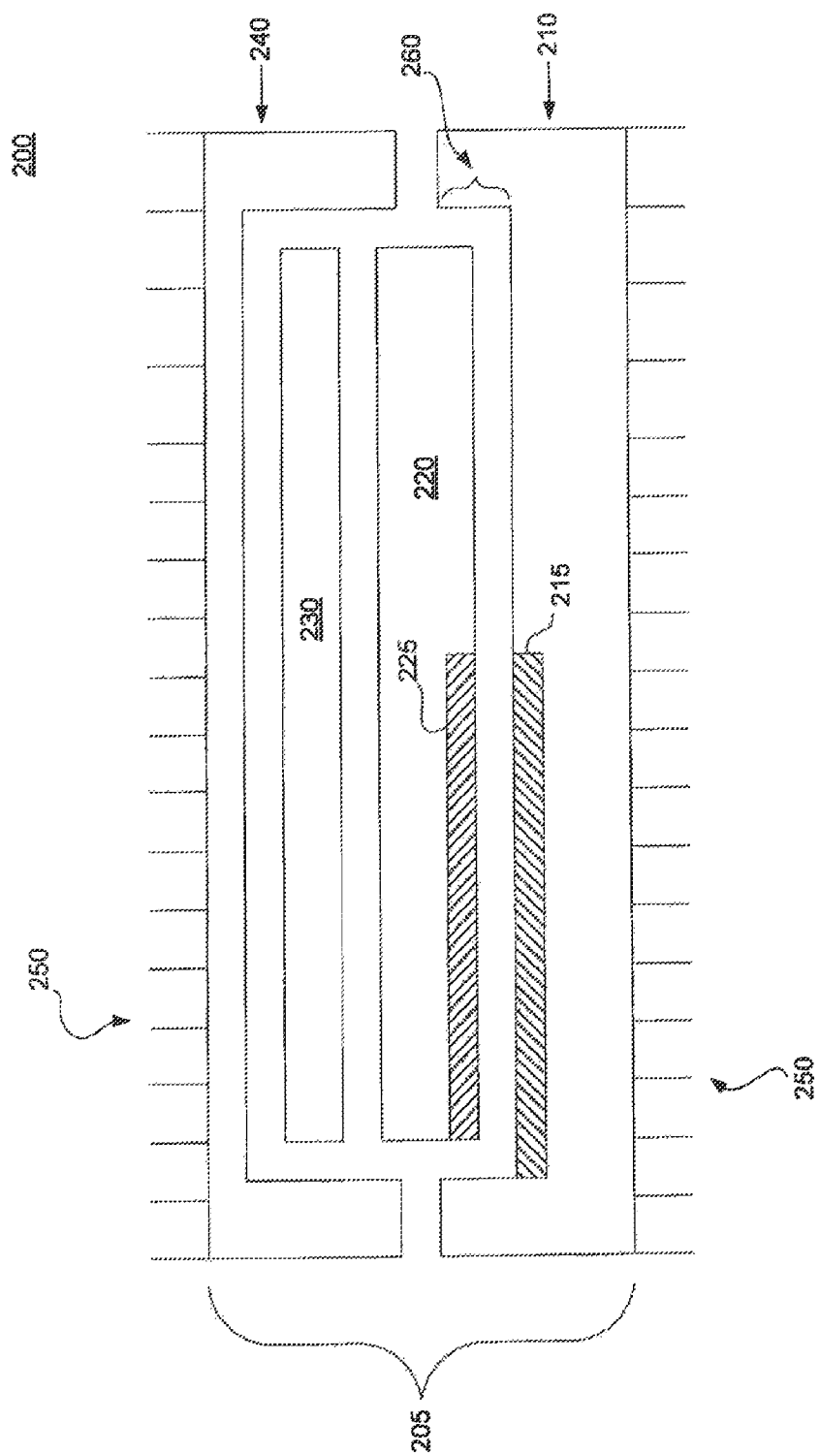
FIG. 3A illustrates a cross-sectional view of an exemplary integrated transceiver.
Figure 3B:
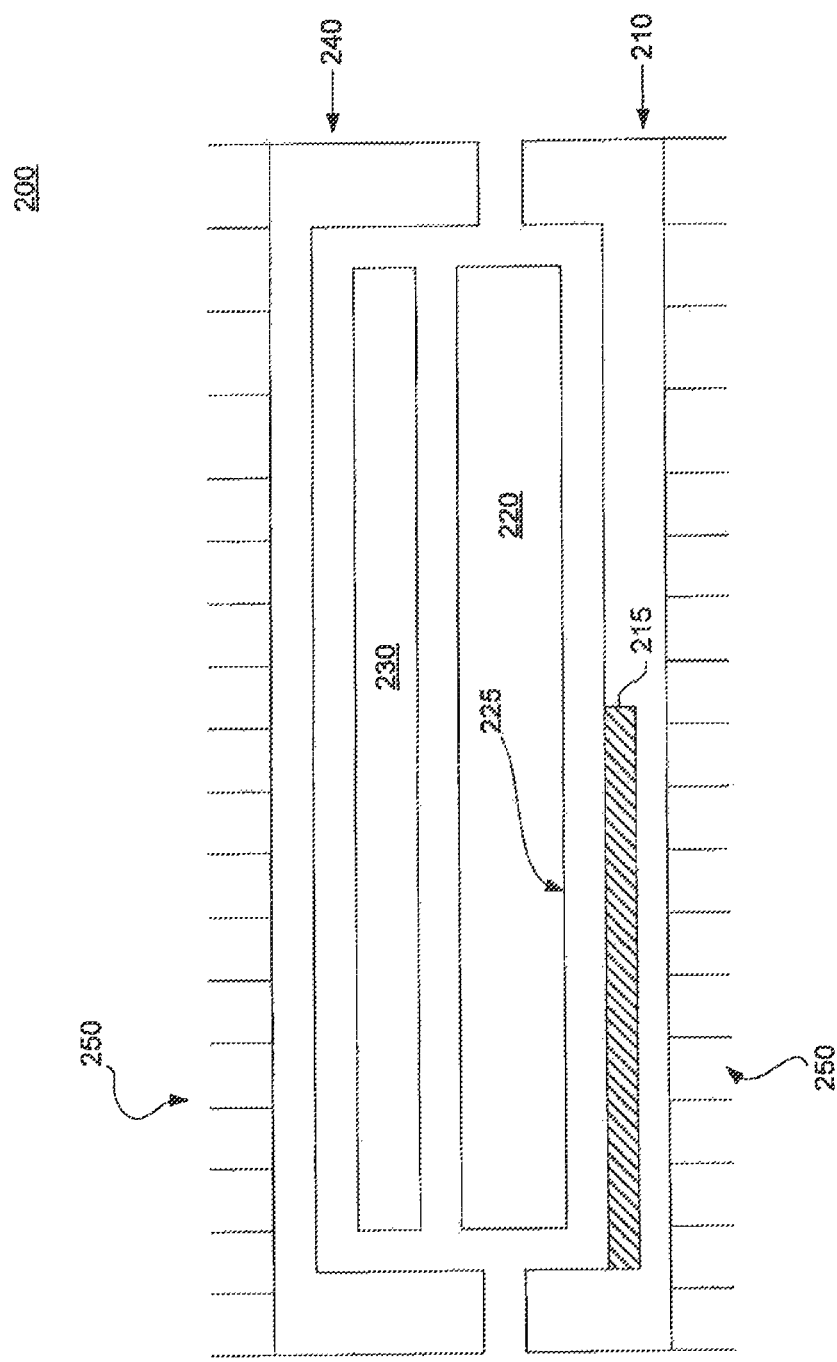
FIG. 3B illustrates a cross-sectional view of another exemplary integrated transceiver.
Figure 3C:
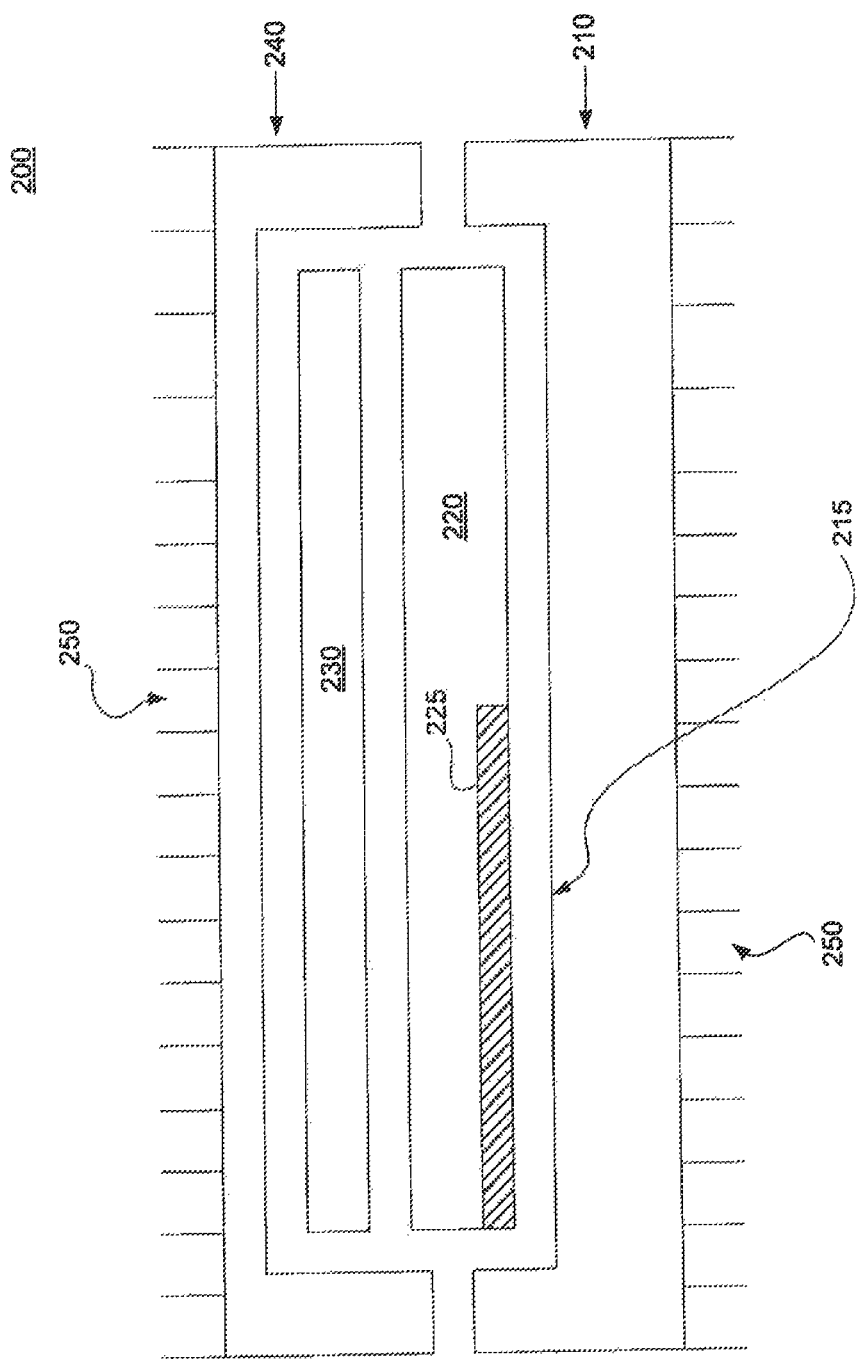
FIG. 3C illustrates a cross-sectional view of yet another exemplary integrated transceiver.
Figure 3D:
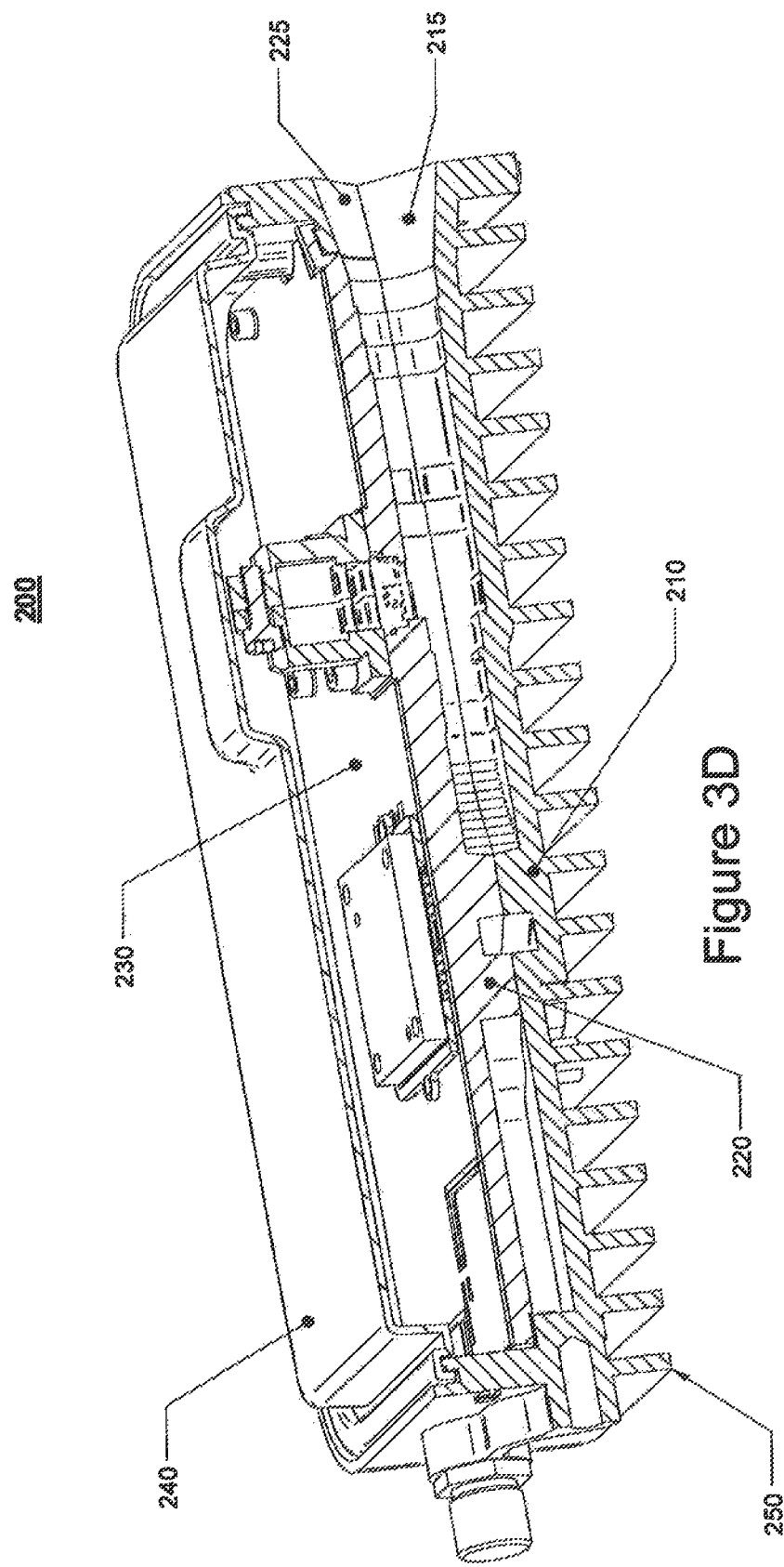
FIG. 3D illustrates a perspective view of an exemplary integrated transceiver.

In accordance with an exemplary embodiment and with reference to FIGS. 3A and 3D, housing base 210 is connected to one side of sub-floor component 220. In a further exemplary embodiment, transceiver PCB assembly 230 is connected to sub-floor component 220 on the side of sub-floor component 220 that is opposite the side that is connected to housing base 210. In accordance with another exemplary embodiment, housing cover 240 connects to housing base 210, forming a transceiver housing 205. In an exemplary embodiment, one or both of sub-floor component 220 and transceiver PCB assembly 230 fit inside, or partially inside transceiver housing 205. In yet another exemplary embodiment, integrated transceiver 200 further comprises fins 250.

In accordance with further exemplary embodiments of the present invention, integrated transceiver 200 comprises a split block OMT (or other waveguide structure, for example a diplexer) formed from the combination of sub-floor component 220 and housing base 210. In particular, the split block OMT is formed by the combination of first and second portions of the split block OMT (215 and 225 respectively).

Figure 4:
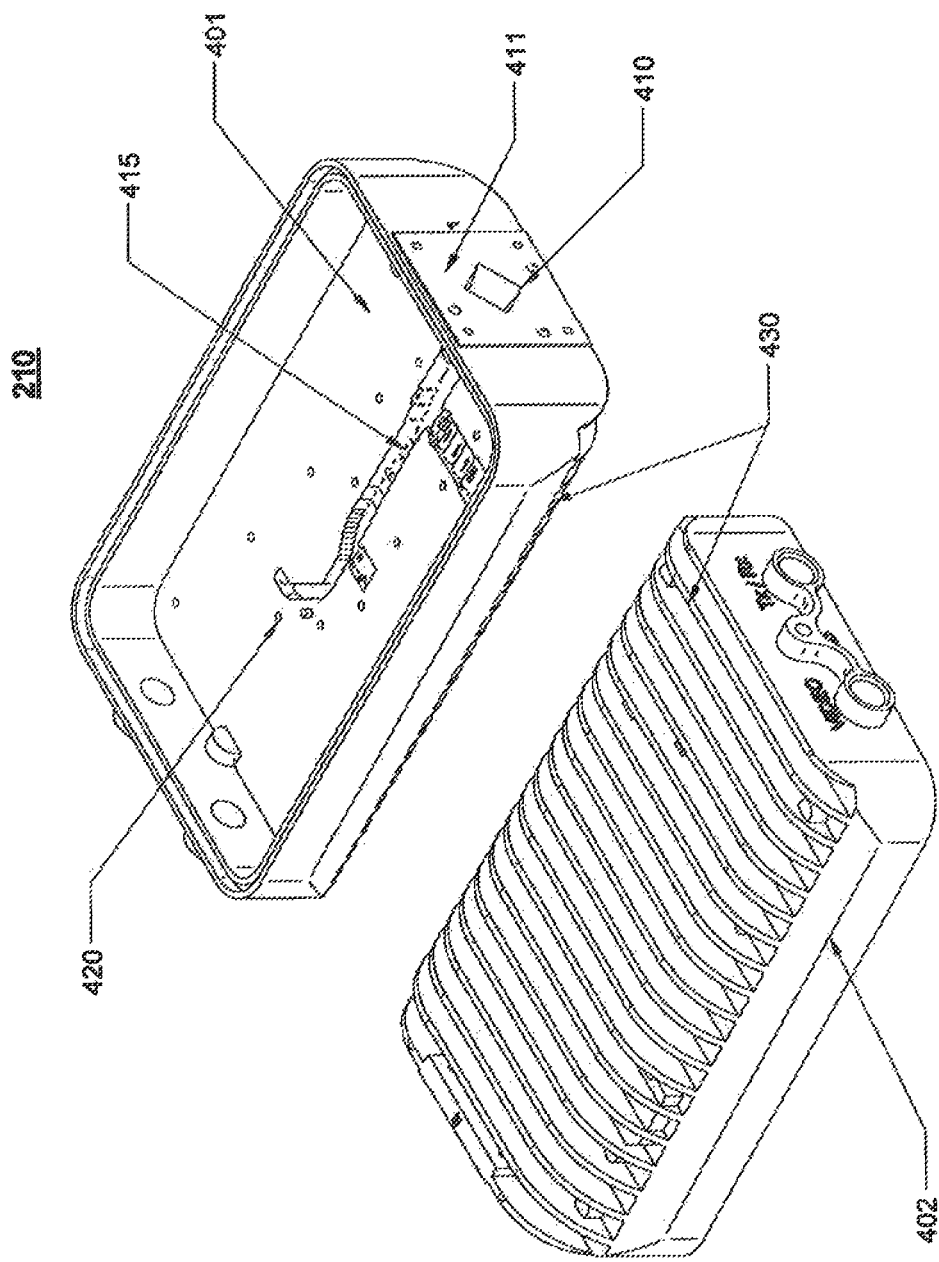
FIG. 4 illustrates a perspective view of an exemplary embodiment of a transceiver housing with fins.

In an exemplary embodiment and with reference to FIG. 4, housing base 210 has an inner surface 401 and an outer surface 402. Housing base 210 may also be referred to as a tub, bottom plate, or bottom chassis. It should be noted, however, that although top/bottom terminology is sometimes used herein, in an exemplary embodiment, the housing may be mounted edgewise (vertically) and thus, the bottom would be one side and the top would be another side. Thus, such references are relative to the device itself, and not limiting of the physical orientation of the housing.

In an exemplary embodiment, housing base 210 comprises a first OMT portion 415. In the exemplary embodiment, first OMT portion 415 is not functional as an OMT by itself, but does comprises at least a portion of a split-block OMT. In an exemplary embodiment, first OMT portion 415 is molded or cast into the inner surface of housing base 210. In accordance with an exemplary embodiment, housing base 210 is made of a thermally and electrically conductive material, such as various metal and plastic materials. For example, housing base 210 may be made of aluminum or zinc. Furthermore, housing base 210 may also comprise at least one of magnesium, copper, steel, brass, tin, or any metal alloy suitable for use as a waveguide, heatsink, enclosure, and/or structure.

In another exemplary embodiment, housing base 210 further comprises at least one of an OMT common port 410, a polarizer mounting interface 411, a series of fins 430, and threaded holes 420 configured for attachment to sub-floor component 220. In an exemplary embodiment, polarizer mounting interface 411 facilitates a polarizer attaching directly to the transceiver housing (e.g., housing base 210) and aligning the polarizer with OMT common port 410.

Figure 5:
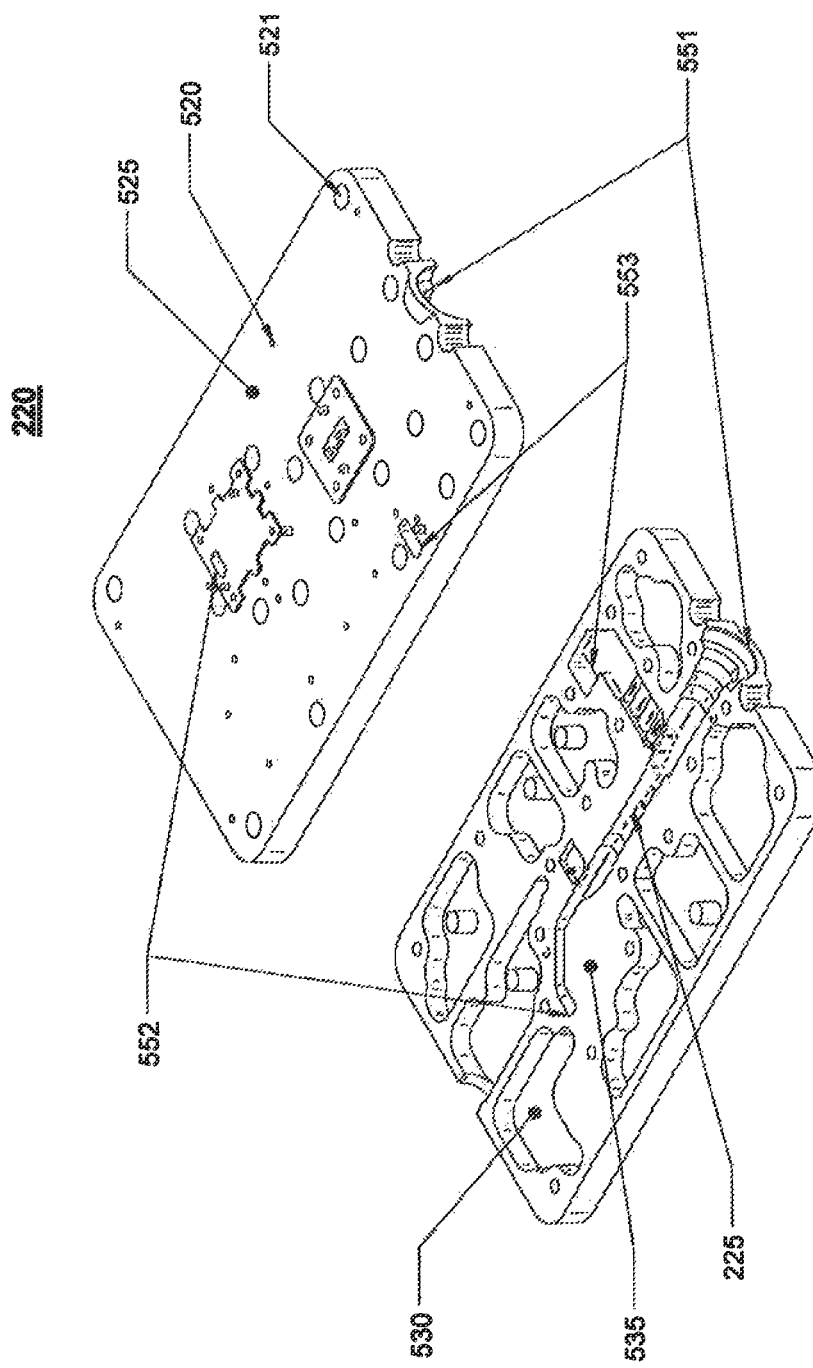
FIG. 5 illustrates an exemplary sub-floor component.

In accordance with an exemplary embodiment and with reference to FIG. 5, sub-floor component 220 comprises the second OMT portion 225. Sub-floor component 220 may also comprise at least one of threaded holes 520 configured for attachment to transceiver PCB assembly 230, holes 521 configured for attachment to housing base 210, and a mounting surface 525 for mounting transceiver PCB assembly 230. Furthermore, in an exemplary embodiment, sub-floor component 220 comprises weight relieved area 530 and heat transfer areas 535. In an exemplary embodiment, heat transfer areas 535 are designed to be located near heat producing electronic components and facilitate thermal heat transfer.

Furthermore, second OMT portion 225 comprises an upper part of an OMT common port 551, a transmit port 552 configured to interface with transceiver PCB assembly 230, and a receive port 553 configured to interface with transceiver PCB assembly 230. The transmit port 552 and receive port 553 are apertures through sub-floor component 220 and facilitate the communication of RF signals between transceiver PCB assembly 230 and the integrated OMT.

In an exemplary embodiment and with momentary reference to FIG. 3A, sub-floor component 220 is configured to attach to the inner surface of housing base 210. In accordance with an exemplary embodiment, housing base 210 may comprise a recessed portion 260. Sub-floor component 220 may be configured to fit within recessed portion 260, such that it does not protrude above the top portion of the recess. In other exemplary embodiments, the sub-floor component may be partially within the recess and partially extend above the recess in housing base 210. In other exemplary embodiments, sub-floor component 220 does not include a recessed portion. In an exemplary embodiment, the second OMT portion 225 is molded or cast into sub-floor component 220 on the side which attaches to the inner surface of housing base 210.

In accordance with an exemplary embodiment, sub-floor component 220 may be formed from a single structure. In another exemplary embodiment, sub-floor component 220 may be formed from multiple structures. One or more of those multiple structures may comprise the second portion 225 of the split block OMT.

Furthermore, in one embodiment, sub-floor component 220 is made of any of the materials discussed above in connection with housing base 210. In one exemplary embodiment, sub-floor component 220 materials are the same material as housing base 210. In other embodiments, the sub-floor component is made of different material than the housing base. In various exemplary embodiments, sub-floor component 220 comprises a thermally and electrically conductive material.

In accordance with an exemplary embodiment, first OMT portion 215 aligns with second OMT portion 225 of housing base 210. In an exemplary embodiment, first OMT portion 215 and second OMT portion 225 are complementary to each other. In other words, at least the OMT related structures in the two portions are substantially mirrored. The first and second OMT portions 215 and 225 combine to form a split-block OMT. In an exemplary embodiment, the OMT structures are substantially symmetric. In other exemplary embodiments, the two structures are not symmetric.

Various embodiments of the split block OMT are contemplated, including different divisions of the OMT portions between first OMT portion 215 and second OMT portion 225. In one embodiment and with reference to FIG. 3B, first OMT portion 215 is cast with all, or substantially all, of a relief of the OMT, and second OMT portion 225 is flat, or substantially flat. By flat, it should be understood that the second OMT portion 225 primarily forms a lid for the wave guide, but contains little more of the wave guide structure. In a second embodiment and with reference to FIG. 3C, first OMT portion 215 is flat, or substantially flat, and second OMT portion 225 is cast with all, or substantially all, of a relief of the OMT. Moreover, the OMT may be divided between the first and second OMT portion 215, 225 using any ratio or percentage of division.

Thus, in accordance with an exemplary embodiment, integrated transceiver 200 comprises an integrated split-block waveguide that comprises at least two structures with one of the at least two structures being integrated into the housing structure and wherein the combined structures form a split block OMT. In this embodiment, neither of the at least two structures would form an OMT by itself.

Figure 3E:
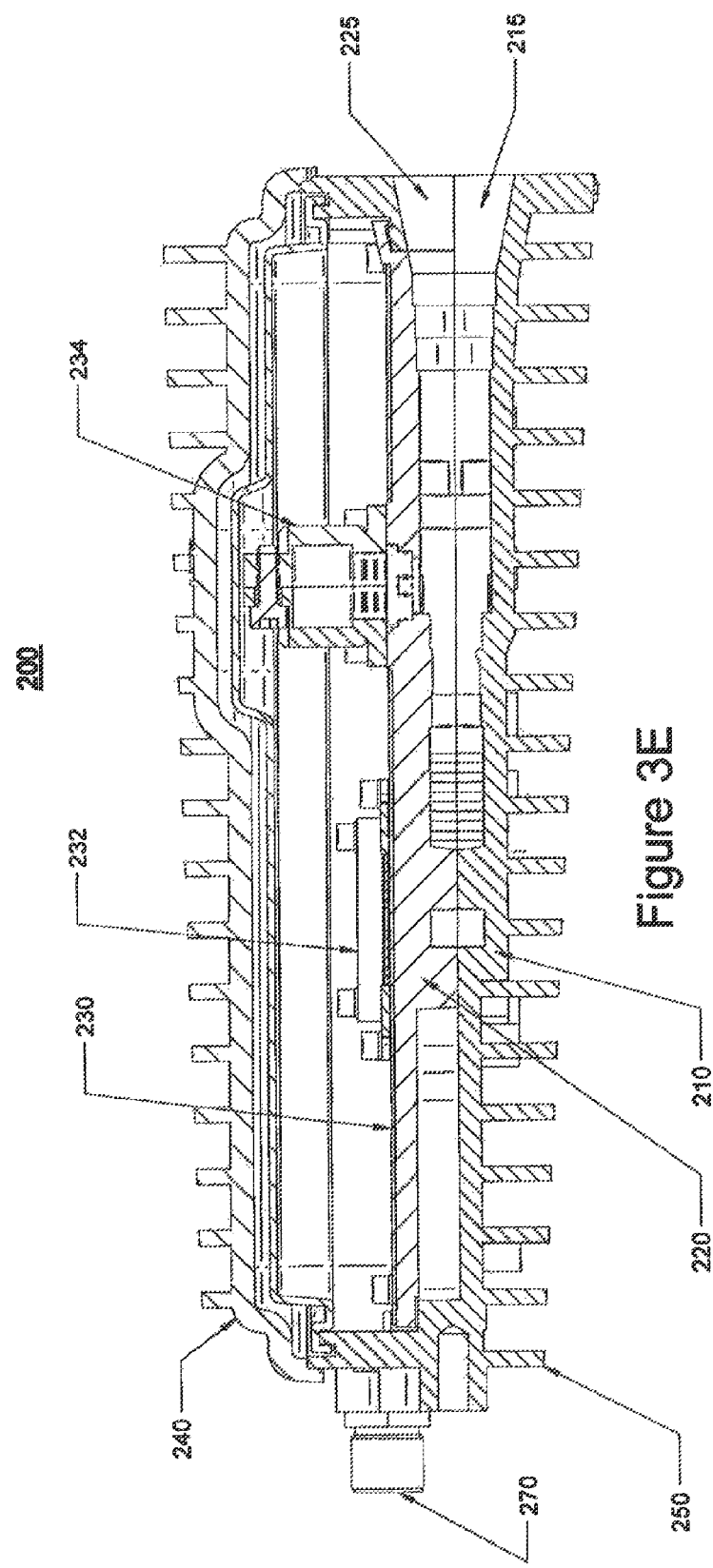
FIG. 3E illustrates a cross-sectional view of an exemplary integrated transceiver.

In an exemplary embodiment and with reference to FIG. 3E, integrated transceiver 200 further comprises a transmit circuit 232 and transceiver PCB assembly 230 further comprises a receive port load 234. Integrated transceiver 200 may further comprises a cable connector 270 configured to receive a cable connection.

In accordance with an exemplary embodiment, sub-floor component 220 is connected to housing base 210 using threaded fasteners, adhesive, brazing, welds, or localized pressure. Furthermore, other techniques to secure two components now known or hereinafter devised are contemplated.

Split Block OMT/Sub-Floor Component

In accordance with further exemplary embodiments and reference to FIG. 2A, the split block OMT has three channels and corresponding ports: the common channel and common port 251, the transmit channel and transmit port 252, and the receive channel and receive port 253. It is noted, however, that other/additional channels and ports may be used. The common port 251 is configured to communicate with the polarizer and acts as a throughway for transmit and receive RF signals. The transmit channel communicates a transmit RF signal and the receive channel communicates a receive RF signal.

The transmit port 252 and receive port 253 may be configured to communicate with transceiver PCB assembly 230. For example, the transmit port 252 and receive port 253 may be connected to transceiver PCB assembly 230 via openings through sub-floor component 220. Furthermore, any other arrangement for connecting transmit port 252 and receive port 253 to transceiver PCB assembly 230 may be used.

Transceiver PCB Assembly

In an exemplary embodiment, transceiver PCB assembly 230 comprises a printed circuit board and is configured to transmit and receive RF signals. In accordance with an exemplary embodiment, transceiver PCB assembly 230 comprises a monolithic microwave integrated circuit (MMIC) and other electrical components. In another exemplary embodiment, transceiver PCB assembly 230 comprises discrete components. In accordance with an exemplary embodiment, transceiver PCB assembly 230 comprises Rogers microwave PCB material and is populated with electronic surface mount component or may include passive components etched into the PCB surface. Moreover, any suitable transceiver PCB assembly as would be known in the art that is configured to aid in the transmitting and receiving RF signals may be used. In an exemplary embodiment, transceiver PCB assembly 230 operates in the Ka band with receive frequencies in the approximate range of 17-21 GHz and transmit frequencies in the approximate range of 27-31 GHz, with an antenna gain in the approximate range of 40-50 dBi.

Housing Cover

Furthermore, in an exemplary embodiment, housing cover 240 connects to housing base 210 and is configured to protect transceiver PCB assembly 230. In an exemplary embodiment, housing cover 240 comprises two or more pieces. For example, housing cover 240 may comprise an environmental cover such as stamped aluminum and an outer cover made of plastic or other suitable material. Housing cover 240 may also be referred to as a top plate or upper chassis. In one embodiment, housing cover 240 attaches to housing base 210 using multiple tabs. The tabs may be located on the outside of the housing or may be located on the inside of the housing to secure the housing halves. In an exemplary embodiment, the tabs are made of at least one of metal or plastic. In other various embodiments, housing cover 240 attaches to housing base 210 by way of threaded fasteners, adhesive, hooks, snaps, latches, or other suitable attachment mechanisms as would be known to one skilled in the art.

In various exemplary embodiments, housing cover 240 comprises plastic, metal, or any other suitable material. For example, in one exemplary embodiment, housing cover 240 is made of stamped and drawn 5052 aluminum sheet.

Fins

In an exemplary embodiment and with reference to FIG. 4, integrated transceiver housing 400 further comprises fins 430. The fins 430 may be located on the housing cover 240 and/or on the housing base 210. Fins 430, in an exemplary embodiment, are configured to dissipate heat. In particular, fins 430 may be integral to housing base 210 and configured to dissipate heat that passes through the OMT from transceiver PCB assembly 230. In one exemplary embodiment, fins 430 are cast as part of integrated transceiver housing 400. Fins 430 may be designed to increase the amount of convection heat transfer surface. For example, spacing and thickness may be chosen to maximize heat transfer to the ambient atmosphere. Furthermore, the fin design may take into consideration the allowable casting aspect ratio and fin efficiency (which drops off with length).

Heat Transfer

As indicated above, integrated transceiver 200 may be configured to facilitate heat transfer away from transceiver PCB assembly 230. In an exemplary embodiment, sub-floor component 220 and housing base 210 are configured to serve together as a heat sink for transceiver PCB assembly 230. In one exemplary embodiment, the RF signal paths in the integrated OMT and the location of heat sources in transceiver PCB assembly 230 are designed to facilitate heat flow through the integrated OMT. For example, the MMIC is placed over a portion of the OMT that does not include channels for the RF signal, or the OMT signal paths are designed to not be located directly under a heat source in the transceiver PCB assembly. Thus, integrated OMT 200 may be designed such that significant heat sources are not located vertically above communication channels in integrated OMT 200. Significant heat sources may be defined as components over a couple of Watts and power dissipation densities over 10 Watts/cm$^2$.

In another exemplary embodiment, the sub-floor and housing base serve as a structural support for the transceiver circuit board. In yet another exemplary embodiment, sub-floor component 220 is designed to act as an RF ground and a DC ground for the transceiver.

In accordance with an exemplary embodiment, a seal is used between the sub-floor component and the housing base. For example, an O-ring may be used, and the sub-floor and/or housing base may be configured such that a hermitic seal may be formed by the O-ring between the sub-floor and housing base. The seal may be configured to reduce or minimize RF leakage in the OMT and protect electrical components.

Furthermore, in an exemplary embodiment, assembly components are specifically designed to be made by common and un-novel manufacturing techniques to minimize cost. For example, various processes that may be implemented include: die casting, investment casting, RPM casting, machining (i.e., milling), and stamping/drawing. Other contemplated manufacturing processes may include more expensive but entirely possible processes, such as EDM machining, electroforming and others.

Figure 7:
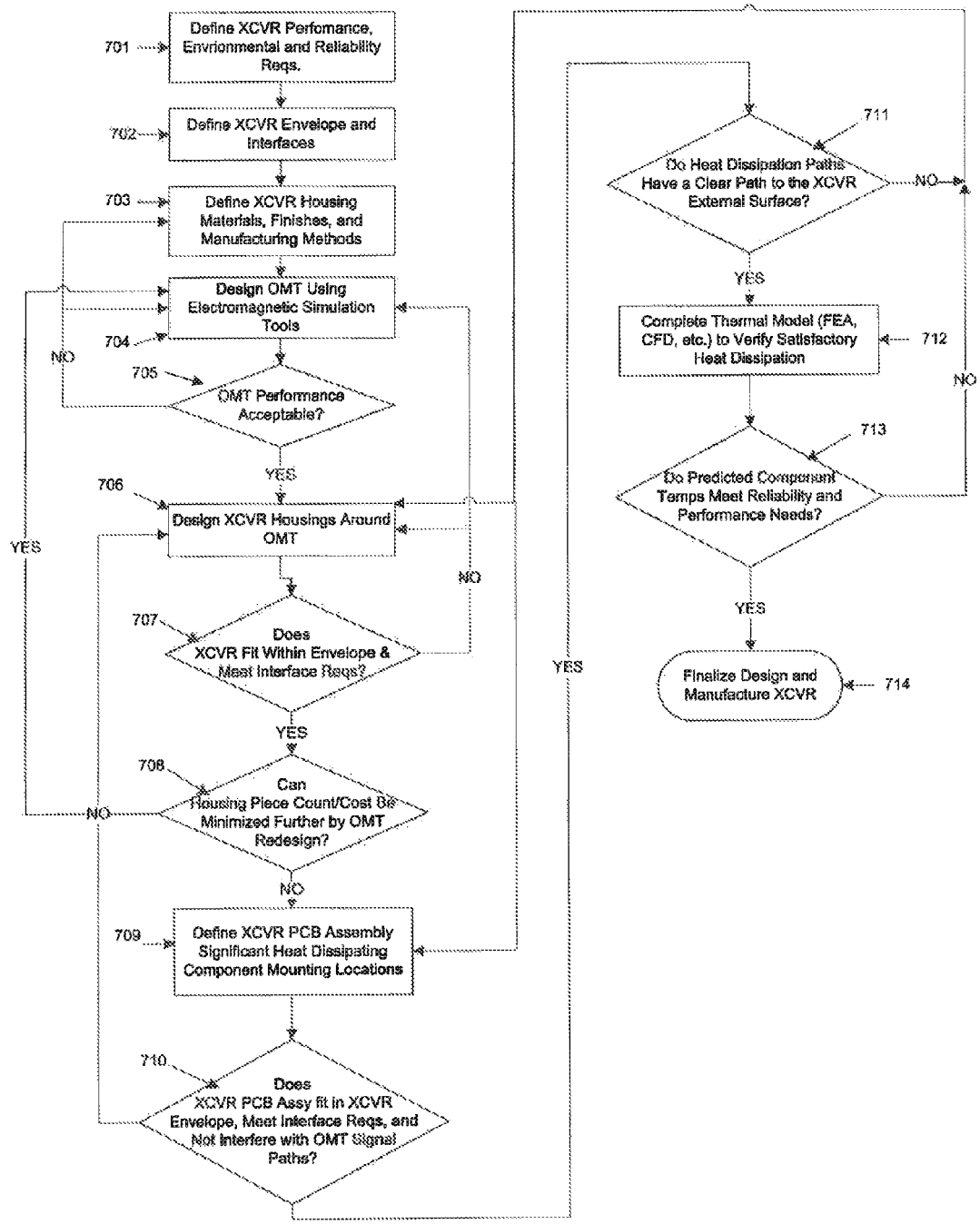
FIG. 7 illustrates an exemplary design process and flowchart.

With reference to FIG. 7, an exemplary method of design of disclosed. The desired transceiver performance, along with the environmental operating conditions and reliability standards are defined (Step 701). Then, define the transceiver envelope and interface (Step 702). Furthermore, transceiver housing materials, finishes, and methods of manufacturing are selected (Step 703).

In an exemplary method, designing the OMT uses electromagnetic simulation tools (Step 704). If testing indicates that the OMT performance is not acceptable, materials and manufacturing methods may be reselected (Step 703) or the OMT may be re-simulated (Step 704). If testing indicates that the OMT performance is acceptable, then begin designing the transceiver housing around the OMT (Step 706). The transceiver should fit within the defined transceiver envelope and meet the interface requirements (Step 707). If the transceiver does not, in the exemplary method the OMT is redesigned (Step 704) and/or the transceiver housing is redesigned (Step 706).

In an exemplary method, a transceiver housing with a low piece count and/or cost is desired. The design may be revised to improve either aspect (Step 708). Once the OMT and transceiver housing design is reached, determine the mounting locations of transceiver components that dissipate significant heat (Step 709). Then, assess whether the transceiver assembly fits the defined transceiver envelope, meets the interference requirements, and does not interfere with OMT signal paths (Step 710). Moreover, a determination is made of whether the heat dissipation paths have a clear path to the transceiver external surface (Step 711). For example, determine whether there is a clear path from the heat sources to fins on the transceiver housing. If so, a thermal model is completed to verify satisfactory heat dissipation (Step 712). If the predicted component temperatures are within acceptable ranges to meet the reliability and performance requirements (Step 713), then the design is finalized (Step 714). If however, one of the design parameters is not satisfied, the OMT may be redesigned (Step 704), the transceiver housing may be redesigned (Step 706), or the component mounting locations may be revised (Step 709).

Antenna System

Figure 6:
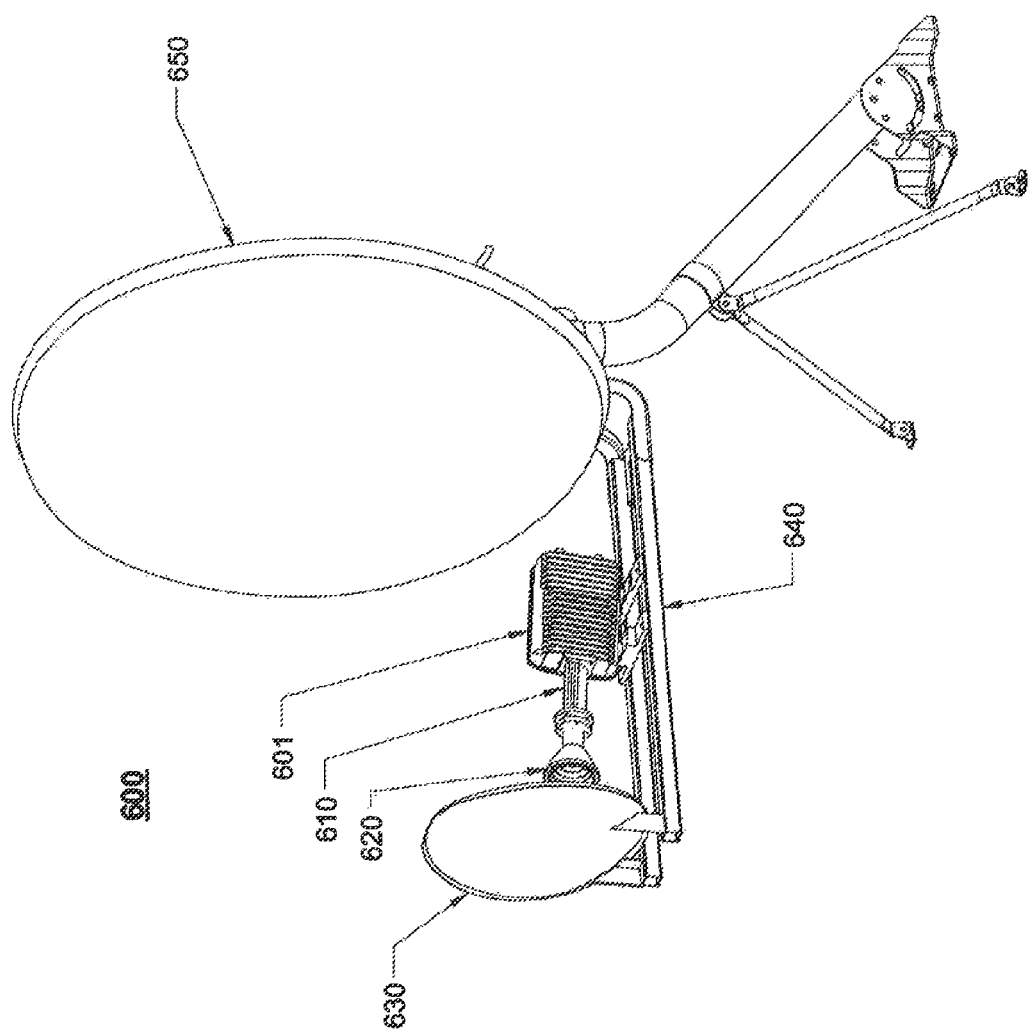
FIG. 6 illustrates an exemplary antenna system.

The integrated transceiver may be part of an overall antenna system. With reference now to FIG. 6, in an exemplary, embodiment an antenna system 600 comprises an integrated transceiver 601, a polarizer 610, and a feed horn 620. Antenna system 600 may further comprise a sub-reflector 630 and a reflector 650. In further exemplary embodiments, antenna system 600 may further comprise a support boom 640. Although various configurations may be used, in one exemplary embodiment, support boom 640 connects reflector 650 to sub-reflector 630 and supports integrated transceiver 601.

In an exemplary embodiment, feed horn 620 attaches to polarizer 610, that is connected to integrated transceiver 601. Thus, in accordance with an exemplary embodiment, an antenna system may comprise an antenna feed that consists solely of a feed horn, or solely of a feed horn and a polarizer. Thus, in accordance with an exemplary embodiment, an antenna system may have only a feed horn, or only a polarizer and feed horn located outside the transceiver housing.

In accordance with a further exemplary embodiment of the present invention, polarizer 610 is also integrated into the transceiver housing. For example, the polarizer may be formed by the combination of the transceiver housing base and the sub-floor component. In this exemplary embodiment, feed horn 620 would be attached to the integrated transceiver housing for communication with the integrated polarizer.

In accordance with a further exemplary embodiment, feedhorn 620 and polarizer 610 are integrated into the transceiver housing. For example, in one embodiment, polarizer 610 is formed by the combination of the transceiver housing base and the sub-floor component and feedhorn 620 is formed by at least one of the transceiver housing base or a combination of the transceiver housing base and the sub-floor component.

In various antenna feed assemblies, the common port of an OMT is smaller than the internal portion of a polarizer. Thus, in an exemplary embodiment, a transition area is designed between the common port of the OMT and the polarizer, such that the transition area tapers from the internal polarizer dimensions to the common port dimensions. An additional benefit to a tapered common port opening is that the angle of the taper in the OMT portions acts as a side slide (also referred to as a pull) for removing a cast component from a mold.

In accordance with various exemplary embodiments, an antenna system comprising an integrated transceiver is smaller than a comparable antenna system that does not integrate the OMT, where the antenna system is defined to include at least a feed horn, polarizer, OMT, and transceiver. Furthermore, smaller should be understood to mean that it is smaller in volume, smaller in length, smaller in width, smaller in height, and/or less bulky. In this regard, an antenna system comprising an integrated transceiver is also likely to be more aesthetically pleasing due to its reduced visibility. Furthermore it is less likely to block signals of the reflector. In other words, a smaller antenna system facilitates more efficient operation of the reflector due to the smaller antenna system not "eclipsing" or "shadowing" a portion of the reflector. Thus, more of the reflector gathers and transmits signals.

In addition, an antenna system comprising an integrated transceiver is likely to have fewer components to assemble than a comparable system that does not have the OMT and/or polarizer integrated. Each component that does not have to be assembled results in at least one less connection point to be assembled. Thus, an antenna system comprising an integrated transceiver is likely to be installed in less time than a comparable system that does not have the OMT and/or polarizer integrated. Similarly, an antenna system comprising an integrated transceiver is less likely to be incorrectly assembled than a comparable system that does not have the OMT and/or polarizer integrated. For example, an installer will not forget the O-ring or insufficiently tighten any fasteners associated with the OMT. Fewer components also facilitates design and building the antenna system because there would likely be fewer manufacturers involved in the overall assembly with whom to coordinate. Similarly, fewer components tend to reduce tolerance errors.

Reduced Leakage Opportunity

In accordance with various aspects of exemplary embodiments, an antenna system comprising an integrated transceiver is less likely to experience moisture leaking into the electronic components than a comparable system that does not have the OMT and/or polarizer integrated. In comparison to the prior art, integrating the OMT eliminates the connection point between an OMT and the transceiver housing and it eliminates the connection joint around the OMT where the two halves of the OMT meet. Thus, integrating the OMT reduces the linear length of joints through which moisture incursion could possibly occur. Similarly, the linear length of joints to be sealed may be reduced through use of an integrated OMT, as compared with a non-integrated OMT. In this manner, an integrated OMT improves the robustness of the antenna system in comparison to the prior art.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "includes," "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. An integrated transceiver comprising:
a sub-floor component comprising a first side and a second side, wherein said first side of said sub-floor component couples to an inner surface of a transceiver housing to form an integrated waveguide.

2. The integrated transceiver of claim 1, further comprising a circuit configured to at least one of transmit and receive radio frequency signals, wherein said circuit is configured to attach to said second side of said sub-floor component.

3. The integrated transceiver of claim 1, wherein neither said transceiver housing nor said sub-floor component alone forms said integrated waveguide.

4. The integrated transceiver of claim 1, wherein said inner surface of said transceiver housing comprises a first portion of said integrated waveguide; and
wherein said first side of said sub-floor component comprises a second portion of said integrated waveguide, and wherein said first portion of said integrated waveguide couples with said second portion of said integrated waveguide to form said integrated waveguide.

5. The integrated transceiver of claim 4, wherein said first portion of said integrated waveguide of said transceiver housing comprises a flat surface, and wherein said second portion of said integrated waveguide of said sub-floor component comprises substantially all of a relief of said integrated waveguide.

6. The integrated transceiver of claim 4, wherein said second portion of said integrated waveguide of said sub-floor component comprises a flat surface, and wherein said first portion of said integrated waveguide of said transceiver housing comprises substantially all of a relief of said integrated waveguide.

7. The integrated transceiver of claim 1, further comprising fins on an outer surface of said transceiver housing, wherein said fins are configured to facilitate thermal dissipation.

8. The integrated transceiver of claim 1, wherein said sub-floor component further comprises at least two apertures comprising a receive port and a transmit port of said integrated waveguide.

9. The integrated transceiver of claim 1, wherein said integrated waveguide is at least one of an orthomode transducer (OMT) or a waveguide diplexer.

10. An antenna system comprising:
a polarizer configured to attach to a feed horn at a first end of said polarizer;
an integrated transceiver having a transceiver housing, wherein said integrated transceiver is configured to attach to a second end of said polarizer;
a first portion of a waveguide of an integrated waveguide assembly, wherein said first portion at least partially forms said transceiver housing, and wherein said first portion does not individually form said waveguide; and
a second portion of said waveguide of said integrated waveguide assembly configured to couple with said first portion of said integrated waveguide assembly to form said integrated waveguide assembly.

11. The antenna system of claim 10, further comprising a transceiver circuit, wherein said transceiver circuit is configured to communicate with said integrated waveguide assembly.

12. The antenna system of claim 10, wherein said second portion of said integrated waveguide assembly is configured to form at least a portion of said waveguide and said second portion is further configured to act as at least one of a heatsink, an RF ground, a circuit board support structure, and an enclosure.

13. The antenna system of claim 10, wherein said integrated waveguide assembly is a split-block orthomode transducer (OMT) that is integrated into the structure, of said transceiver housing.

14. The antenna system of claim 10, wherein said integrated waveguide assembly is a waveguide diplexer that is integrated into the structure of said transceiver housing.

15. The antenna system of claim 10, wherein an external antenna feed of said antenna system does not comprise a waveguide.

16. The antenna system of claim 10, wherein said waveguide of said integrated waveguide assembly is located relative to significant heat sources of said integrated transceiver such that said waveguide does not impede the flow of dissipated heat between the heat sources and said integrated transceiver's external heat dissipating surfaces, and wherein said waveguide is configured to minimize thermal resistance between the heat sources and the dissipating surfaces of said integrated waveguide assembly.

17. The antenna of claim 10, wherein said second portion of said integrated waveguide assembly is configured to act as at least one of a heatsink, an RF ground, a circuit board support structure, and an enclosure.

18. The antenna system of claim 10, wherein said second end of said polarizer is attached directly to said transceiver housing.

19. A method for integrating a waveguide within a transceiver housing, said method comprising:
    forming a first waveguide portion in an inner surface of said transceiver housing;
    for a second waveguide portion in a sub-floor component, wherein said second waveguide portion is complementary to said first waveguide portion; and
    assembling said sub-floor component and said transceiver housing so that said first waveguide portion and said second waveguide portion are coupled and form said waveguide.

20. The method of claim 19, further comprising
    attaching a transceiver circuit to said sub-floor component opposite said second waveguide portion; and
    designing a layout of said first and second waveguide portions and designing the layout of significant heat sources on said transceiver circuit to avoid blocking heat transfer from said transceiver circuit through said waveguide to an exterior portion of said housing base.

* * * * *

UNITED STATES PATENT AND TRADEMARK OFFICE
CERTIFICATE OF CORRECTION

PATENT NO. : 8,433,257 B2
APPLICATION NO. : 13/539721
DATED : April 30, 2013
INVENTOR(S) : David Laidig et al.

It is certified that error appears in the above-identified patent and that said Letters Patent is hereby corrected as shown below:

In the Claims:

In column 12, line 11 the word 'for' should be corrected to 'forming'

Signed and Sealed this
Eleventh Day of June, 2013

Teresa Stanek Rea
*Acting Director of the United States Patent and Trademark Office*